United States Patent
Evrard et al.

(10) Patent No.: US 7,291,811 B2
(45) Date of Patent: Nov. 6, 2007

(54) OVEN FOR HEATING MOVING THERMOPLASTIC MATERIAL CONTAINER BLANKS

(75) Inventors: Alain Evrard, Sidel (FR); Frédéric Lecomte, Sidel (FR); Nasser Takhedmit, Sidel (FR)

(73) Assignee: Sidel, Octeville-sur-Mer (FR)

(*) Notice: Subject to any disclaimer, the term of this patent is extended or adjusted under 35 U.S.C. 154(b) by 17 days.

(21) Appl. No.: 10/537,053

(22) PCT Filed: Dec. 10, 2003

(86) PCT No.: PCT/FR03/03661
§ 371 (c)(1),
(2), (4) Date: Jul. 28, 2005

(87) PCT Pub. No.: WO2004/062885
PCT Pub. Date: Jul. 29, 2004

(65) Prior Publication Data
US 2006/0011604 A1 Jan. 19, 2006

(30) Foreign Application Priority Data
Dec. 12, 2002 (FR) .................................. 02 15715

(51) Int. Cl.
- B29C 35/08 (2006.01)
- B29C 49/68 (2006.01)
- F27B 9/16 (2006.01)
- F27B 9/36 (2006.01)

(52) U.S. Cl. ...................... 219/388; 219/411; 264/458; 264/535; 432/124

(58) Field of Classification Search .................. None
See application file for complete search history.

(56) References Cited

U.S. PATENT DOCUMENTS

| 3,787,170 | A |   | 1/1974  | Gilbert |
| 3,947,243 | A | * | 3/1976  | Sokolow ................... 432/124 |
| 4,025,294 | A |   | 5/1977  | Daane et al. |
| 5,308,233 | A |   | 5/1994  | Denis et al. |
| 5,980,229 | A | * | 11/1999 | Collombin ............... 425/174.4 |
| 6,428,735 | B1 |  | 8/2002  | Deemer et al. |

FOREIGN PATENT DOCUMENTS

DE 199 06 309 A1 8/2000

* cited by examiner

*Primary Examiner*—J. Pelham
(74) *Attorney, Agent, or Firm*—Sughrue Mion Pllc.

(57) ABSTRACT

An oven for heating moving thermoplastic blanks (preforms, intermediate containers), which includes conveying devices for supporting and moving the blanks sequentially while rotating each of them about its own axis. A heating device is arranged laterally to the conveying device for heating the moving blank bodies, and the conveying device includes at least two parallel conveying branches, proximate each other and having opposite conveying directions, the two branches being traveled along one after the other by the blanks. The heating device is arranged between the two conveying branches so as to heat simultaneously on both sides of the blanks moving in opposite directions respectively on the two branches.

6 Claims, 2 Drawing Sheets

OVEN FOR HEATING MOVING THERMOPLASTIC MATERIAL CONTAINER BLANKS

Figure 1:
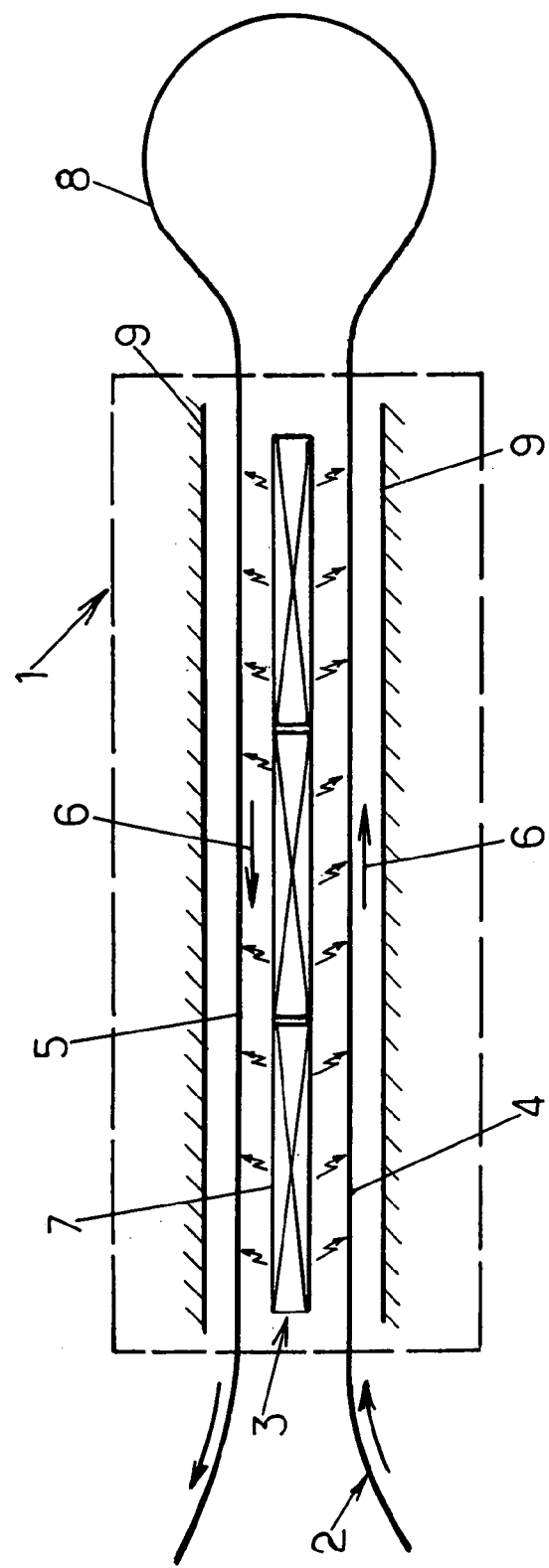

The present invention relates in general to the field of the manufacture of containers, such as bottles, flasks, etc., made of a thermoplastic, such as PET or PEN, by blow molding or stretch-blow molding starting containers or blanks (preforms or intermediate containers) and, more specifically, the invention relates to the phase during which said blanks are heated prior to the blow molding or stretch-blow molding step, so as to soften the plastic and make it deformable.

More precisely, the invention relates to improvements made to ovens for heating blanks on the run, especially preforms or intermediate containers, made of a thermoplastic, this oven including conveying means, suitable for supporting and moving the blanks one after another while rotating each of them about its own axis, and heating means placed laterally to the conveying means so as to heat the bodies of said moving blanks.

So that the stretching process takes place correctly and uniformly over the entire body of the blank, it is necessary for all of the thermoplastic to be raised to a sufficient temperature to be softened without, however, this temperature being excessive in order to prevent the material from crystallizing. This means that, despite the poor conductivity of the thermoplastic, a sufficient amount of heat (generated for example continuously by infrared radiation) propagates through the entire thickness of the wall of the blank (e.g. heating to the core).

In the case of certain heating means, such as infrared lamps, no purpose is served by forcing the infrared transmission power in order to try to achieve this result more quickly, since the poor thermal conductivity of the thermoplastic entails a certain lapse in time in order to achieve core heating, and a reduction in this time, by increasing the power of the infrared radiation, runs the risk of causing the surface material on the external face of the wall to crystallize. Such a solution must therefore necessarily be discarded.

A solution to the problem must therefore be sought in an extension of the time during which the thermoplastic is exposed to the heating means.

One conceivable solution might consist in slowing down the blanks that are moving past the laterally positioned heating means. However, it should also be noted that container manufacturers are constantly seeking to increase production rates, which can be achieved in particular by increasing the machine speeds. Such an aspiration therefore goes counter to lowering the speed of movement of the manufacturing line at any point thereon. This solution must therefore be discarded also.

Admittedly, it would be conceivable to reduce the run speed of the blanks through the oven (for example reducing the speed by half), but having two ovens fed in parallel—the total treatment capacity would then be maintained. However, this solution would be very expensive both in terms of equipment and in energy, and must also be discarded.

A useful solution might consist in increasing the length of the oven, which, for a given run speed of the blanks, would lead to an increase in the exposure time. It then becomes conceivable to reduce the transmission power of the heating means, this being permitted by the fact that there is then enough time for the heat to propagate through the thickness of the wall of the blanks. Admittedly, this solution entails an overcost in terms of equipment, in order to lengthen the oven, but in use it proves to be economic owing to the reduction (which may be up to 35%) in the energy needed for the heat treatment of the blanks.

However, this solution, although generally beneficial for the reasons indicated above, has a drawback due to the great length of the oven thus provided, which proves to be difficult to implement in practice.

It is under these conditions that the invention proposes an improved solution, which meets the requirement expressed by longer exposure of the blanks to the heating means while still avoiding the various disadvantages of the above mentioned solutions.

For this purpose, the invention proposes an oven for heating blanks on the run, especially preforms or intermediate containers, made of a thermoplastic, this oven comprising conveying means, suitable for supporting and moving the blanks one after another while making each of them rotate about its own axis, and heating means placed laterally to the conveying means so as to heat the bodies of said moving blanks, said oven, being designed in accordance with the invention, is characterized in that the conveying means are arranged so as to have at least two conveying branches lying approximately parallel to each other, and near each other, and having opposite conveying directions, the blanks traveling along said two branches one after each other, and the heating means being placed between said two parallel conveying branches and arranged so as to heat, bilaterally and simultaneously, the blanks running in opposite directions along the two conveying branches respectively.

Preferably, the two branches are joined, at one of their ends, by a loop conveying section that is located outside the zone where the heating means act and which consequently constitutes a zone for thermally stabilizing the blanks.

Thanks to this arrangement, each blank passes at least twice through the oven, with an interruption between these two heating phases, which corresponds to the path in which the conveying means turn around and which constitutes a stabilization step during which the heat continues to diffuse into the material. The heating time is thus doubled, and results in a thermoplastic being heat treated under optimum conditions, causing the entire plastic to be heated uniformly and right to the core.

From the structural standpoint, the aforementioned beneficial result is obtained with a single combination of heating means, the effectiveness of which is doubled by the fact that use is made here of their radiation in two directions, and no longer in one direction as in a conventional oven.

Admittedly, oven arrangements with two files of moving objects to be treated on either side of heating means are known (see for example documents EP-A-0 868 284 and DE-A-24 27 611). However, in these known arrangements, the two files of objects to be heated move in the same direction. These known ovens make it possible to double the treatment capacity, but each object performs only a single pass through the oven. Consequently, the exposure time of each object is not extended relative to the exposure time of an object passing through a conventional oven (i.e. a single file of objects) of the same length.

In addition, it should be noted that, in an oven with two passes in opposite directions, as recommended in accordance with the invention, the two successive exposures of each object to the heating means, resulting in an increase in the exposure time, may advantageously be accompanied by a reduction in the power of the radiation emitted by said heating means, and therefore by a reduction in the electrical power consumed. This is particularly of interest to the user (trials have demonstrated that the saving obtained, using infrared lamps, amounts to, or even exceeds, 50%).

In one advantageous embodiment, the oven includes two pairs of parallel conveying branches with heating means placed between the two branches of each pair respectively, the four conveying branches being connected together via loop conveying sections located outside the zones where the heating means act. To make a compact oven, it is advantageous for the four conveying branches to be mutually parallel and preferably, for the branches to be approximately rectilinear.

Preferably, reflectors may be associated, in a manner known per se, with the heating means, these reflectors being placed alongside each conveying branch on the opposite side from that occupied by the heating means.

Figure 2:
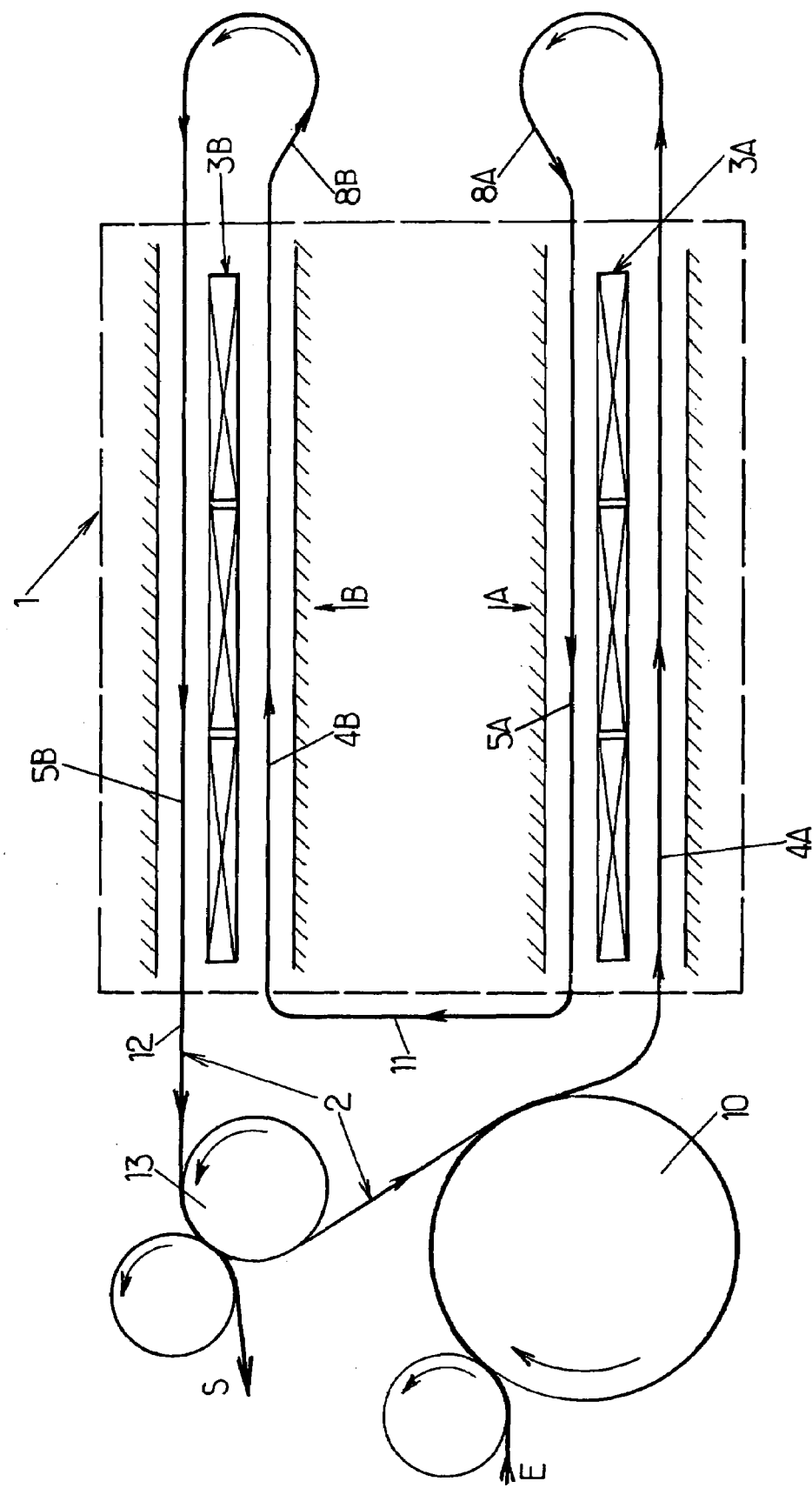

The invention will be more clearly understood on reading the following detailed description of certain embodiments given as entirely non-limiting examples. In this description, reference will be made to the appended drawings in which:

FIG. 1 is a simplified diagram illustrating an oven arrangement implementing the provisions of the invention; and FIG. 2 is a simplified diagram illustrating an advantageous example of oven embodiment exploiting the provisions of FIG. 1.

Referring firstly to FIG. 1, an oven 1 is intended for heating blanks on the run, especially preforms or intermediate containers, made of a thermoplastic such as PET or PEN, it being possible for such an oven to be placed in particular upstream of a blow molding or stretch-blow molding installation for manufacturing containers.

The oven 1 includes conveying means 2 suitable for supporting and moving blanks (not shown) one after another, while rotating each of them about its own axis. These conveying means may consist, in a manner known per se, of an articulated sequence or chain of support devices ("spinners") suitable for supporting the blanks by their neck, while at the same time these support devices are rotated (for example by the meshing of a toothed wheel, which is fastened thereto, with a fixed lateral chain or rack) in such a way that each blank, at the same time as it is being moved, is rotated so that its body is exposed over its entire periphery to heating means 3 placed laterally to the conveying means.

According to the invention, the conveying means 2 are designed so that at least two conveying branches 4, 5 lie approximately parallel to each other and near each other, while having opposite directions of movement. The blanks travel, one after another (in series), as shown symbolically by the arrows 6, along the two branches 4, 5.

The heating means 3 are placed between the two branches 4, 5 of the conveying means 2 and are designed so as to operate on both sides and to simultaneously heat the blanks moving in opposite directions along the two branches 4, 5 of the conveying means, respectively.

As an example, FIG. 1 shows the heating means 3, which here are in the form of three successive sets 7 of infrared heating lamps.

The two branches 4, 5 of the conveying means, which in a preferred embodiment are approximately rectilinear inside the oven as illustrated in FIG. 1, are simply joined to each other, at one end (on the right in FIG. 1) of the oven 1, by a loop-shaped section 8 of the conveying means.

The loop section 8 of the conveying means, apart from its function of joining together the branches 4, 5 that pass through the oven, also acts as a stabilization zone, allowing the heat to continue to propagate into the thermoplastic and preventing excessive heating of the external face of the body of the blanks.

The oven 1 is equipped in a manner known per se with reflectors 9 placed facing the heating means 3, on the other side of the branches 4, 5 of the conveying means.

In an oven designed according to the invention, each blank passes twice in succession opposite the heating means with an intermediate thermal stabilization period. For an oven of given length, the same heating time is obtained for each preform, with a substantial reduction in the power of the heating means and therefore in the electrical power consumed, without an increase in the number of heating lamps and without increasing the working length of the oven, compared with a conventional oven having a single conveying file, although the preforms are heated more uniformly and to the core.

FIG. 2 illustrates schematically a specific example of an oven implementing the above provisions. In practice, the arrangement illustrated in FIG. 1 consists in duplicating (with parts A and B) the arrangement shown in FIG. 1, the blanks then making four successive passes through the oven, and therefore there are four successive heatings, interspersed with thermal stabilization periods.

The blanks arriving at E are delivered by means 10 (such as a feed wheel) for charging the conveying means 2, consisting of a closed-loop chain 2 of support devices. The chain 2 then enters the part A of the oven 1 via its branch 4A, where the blanks undergo a first heating operation, and then, after passing along the loop section 8A, a second heating operation on the branch 5A.

The blanks then pass along a joining section 11, which also defines a thermal stabilization zone, bringing them to the second part B of the oven, in which they follow a similar path: branch 4B with heating, loop section 8B with thermal stabilization, branch 5B with heating.

On leaving the branch 5B, a section 12 brings the blanks to the unloading means 13 (such as a "discharging" wheel) where they are detached from the support devices of the chain 2 (which chain returns to the charging means 10) and are discharged at S toward, for example, a blow molding or stretch-blow molding unit. Since the discharging means 13 are not immediately adjacent to the exit of the oven, the section 12 itself constitutes a thermal stabilization zone that completes the diffusion of heat into the thermoplastic.

The four branches 4A, 5A, 4B, 5B may be mutually parallel so that it is possible to construct an oven of simple and compact design, with little heat loss. Furthermore, it is possible to place, in the central part, between the above mentioned parts A and B of the oven, members that are common to the operation of these two parts A and B, and especially a fan delivering the gas that cools the surface of the blanks.

The invention claimed is:

1. An oven for heating blanks on the run, especially preforms or intermediate containers, made of a thermoplastic, this oven comprising conveying means suitable for supporting and moving the blanks one after another while making each of them rotate about its own axis, and heating means placed laterally to the conveying means so as to heat the bodies of said moving blanks, wherein the conveying means are arranged so as to have at least two conveying branches lying substantially parallel to each and having opposite conveying directions, said two branches being traveled one after each other by the blanks, the heating means being placed between said two parallel conveying branches which extend near each other, wherein said heating means includes only one single line of heating infrared lamps, which extends between and substantially parallel to said two conveying branches, so that said infrared lamps heat, bilaterally and simultaneously, the blanks running in the opposite conveying directions along the two conveying branches respectively.

2. The oven as claimed in claim 1, wherein the two conveying branches are joined, at one of their ends, by a loop conveying section that is located outside the zone where the heating infrared lamps act.

3. The oven as claimed in claim 1, wherein it includes two pairs of parallel conveying branches with heating infrared lamp placed between the two branches of each pair respectively, the four conveying branches being connected together via loop conveying sections located outside the zones where the heating infrared lamps act.

4. The oven as claimed in claim 3, wherein the four conveying branches are mutually parallel.

5. The oven as claimed in claim 1, characterized in that the conveying branches are substantially rectilinear.

6. The oven as claimed in claim 1, wherein reflectors are placed alongside each conveying branch on the opposite side from that occupied by the heating infrared lamps.

* * * * *